T. & J. Nevison,
Carriage Wheel.

No. 74579

PATENTED FEB 18 1868

Inventors,
Thos. Nevison Jr.
James Nevison

Witnesses,
J. Holmes
Frank S. Alden

United States Patent Office.

THOMAS NEVISON, JR., AND JAMES NEVISON, OF MORGAN, OHIO.

Letters Patent No. 74,579, dated February 18, 1868.

IMPROVEMENT IN CARRIAGE-WHEEL.

The Schedule referred to in these Letters Patent and making part of the same.

TO ALL WHOM IT MAY CONCERN:

Be it known that we, THOMAS NEVISON, Jr., and JAMES NEVISON, of Morgan, in the county of Ashtabula, and State of Ohio, have invented certain new and useful Improvements in Carriage-Wheels; and we do hereby declare that the following is a full and complete description of the same, reference being had to the accompanying drawings making part of this specification, in which—

Like letters of reference refer to like parts in the different views.

Figure 1:
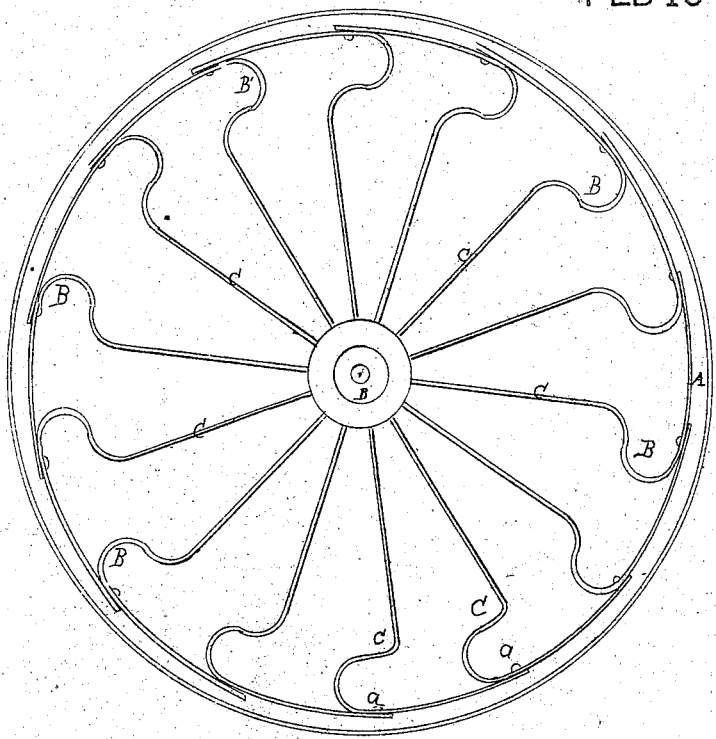
Figure 1 is a side view of the wheel.
Figure 2:
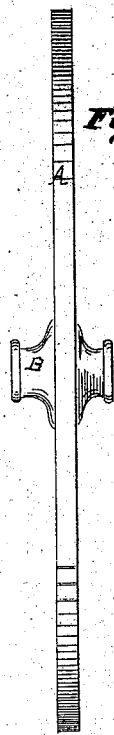
Figure 2 is a view of the edge.

A, fig. 1, represents the rim of the wheel, which is constructed and tired in the usual way. B is the hub, which may be of wood or metal, as desired, and C the spokes. These spokes are made of thin, narrow steel springs, which, as will be seen, are continued straight, in radial lines, until they approach near the rim, and which are then curved abruptly, each in the same direction, forming a semicircle, B', between the end of the straight section of the spoke and the rim. The spoke is continued along on the inside of the felloe, making thereby an inner facing or lining of steel for the rim, giving to the same additional strength and durability.

As it will be seen, each spoke is secured to the felloe by two bolts, d, and at the same time to each other, the extreme end of each spoke being intruded under the bow of the preceding one, thereby making the connection of the spokes to the rim as firm and secure as the same would be if of one entire piece.

We do not confine ourselves to the special curve given to the spoke, as shown at B', but think that, as shown at C', the best for obtaining the largest effective force of the spring.

What I claim as my invention, and desire to secure by Letters Patent, is—

The herein-described wheel, when the spokes of the same are constructed and secured to each other and the felloe or rim, in the manner substantially as set forth.

THOS. NEVISON, JR.,
JAMES NEVISON.

Witnesses:
JOHN J. HOYT,
N. G. FOOTE.